United States Patent [19]
Kraft

[11] Patent Number: 5,375,399
[45] Date of Patent: Dec. 27, 1994

[54] LAWN THATCHING DEVICE AND PROCESS FOR REMOVAL OF THATCH

[76] Inventor: Conrad Kraft, 11920 W. 91st St., Lenexa, Kans. 66215

[21] Appl. No.: 31,317

[22] Filed: Mar. 15, 1993

[51] Int. Cl.⁵ .......................... A01D 43/02; A47L 5/28
[52] U.S. Cl. ...................................... 56/16.7; 15/347; 56/364; 56/DIG. 12
[58] Field of Search ................ 56/16.6, 16.7, 17.5, 56/364, 377, 380, DIG. 12; 15/83, 347, 348, 349

[56] References Cited

U.S. PATENT DOCUMENTS

| | | | |
|---|---|---|---|
| 2,809,389 | 10/1957 | Collins et al. | 15/347 X |
| 3,132,456 | 5/1964 | Konrad | 56/16.7 |
| 3,183,653 | 5/1965 | Cromwell | 56/364 X |
| 3,406,424 | 10/1968 | Rush | 15/347 X |
| 3,790,986 | 2/1974 | Burger | 15/347 X |

*Primary Examiner*—David J. Bagnell
*Attorney, Agent, or Firm*—Thomas M. Scofield

[57] ABSTRACT

Improved machines and devices for thatching lawns (thatch meaning grass blades, leaf fragments and particles, weed fragments and particles and the like that collect around and at the bases of blades of grass and the other plants that make up a lawn); a new leaf and thatch raking device employing novel principles of operation and apparatus and structural features whereby to carry out the leaf and thatch raking task most efficiently; devices which (1) not only "reverse rake" a lawn, thereby to effectively pick up thatch, debris, leaf fragments and leaves, while (2) still further taking or forcing the said raked up material into and through a pulverizing or mulching zone and (3) then passing the processed lawn debris material from said zone into a storage container; an integrated leaf raking and thatching system involving highly efficient raking, highly efficient transport of raked materials from the raking zone, direct passage of the said raked material into a comminuting zone of great effectiveness and efficiency, continuous withdrawal of comminuted material from the last mentioned chamber and, thereafter, a process and means for moving and passing the comminuted material to a closed, yet venting container in a continuous manner whereby to retain the comminuted material in the container and vent the air from the container.

12 Claims, 4 Drawing Sheets

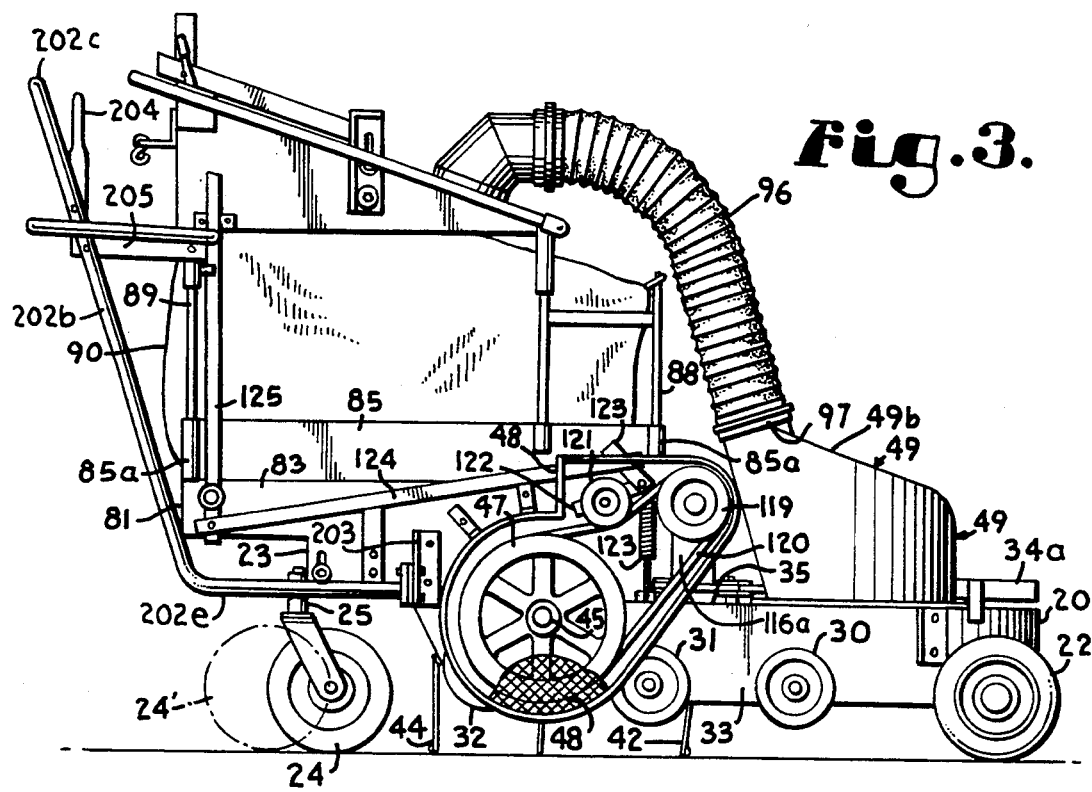
Fig. 3.
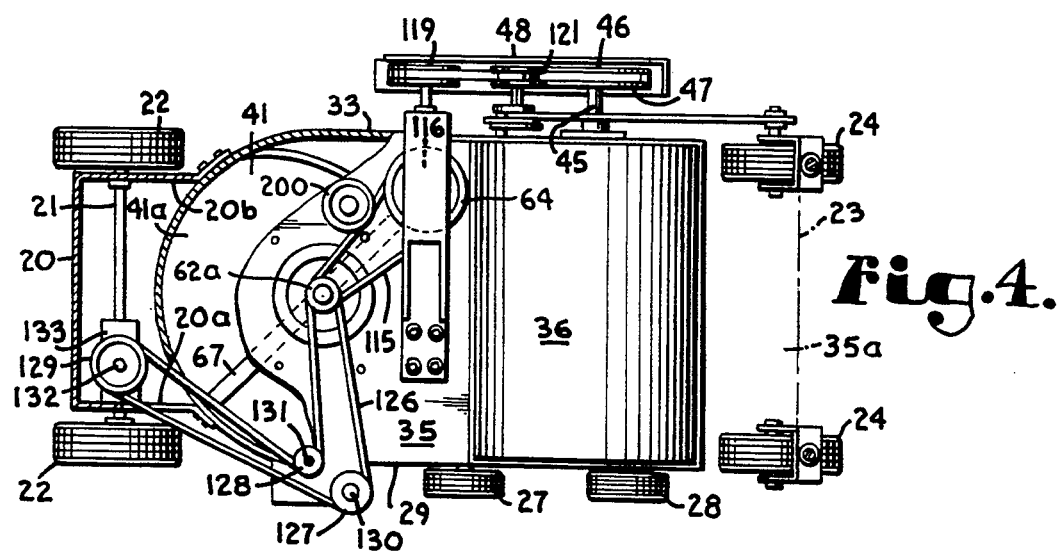
Fig. 4.
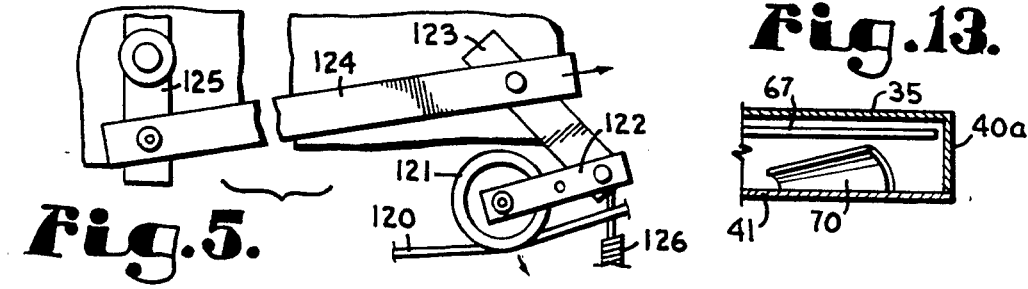
Fig. 5.
Fig. 13.

LAWN THATCHING DEVICE AND PROCESS FOR REMOVAL OF THATCH

BACKGROUND OF THE INVENTION

In the subject application and specification, the term "thatch" is employed to refer to the grass blades, leaf fragments and particles, weed fragments and particles and the like that collect around and at the bases of blades of grass and the other plants that make up a lawn. The subject device is particularly directed to the provision of a new leaf and thatch raking device which employs novel principles of operation and novel apparatus and structural features in order to carry out the leaf and thatch raking task in a most efficient and effective way.

Effective leaf and thatch raking machines which (1) not only "reverse rake" the lawn, whereby to effectively pick up thatch, debris, leaf fragments and leaves, while (2) still further taking the raked material through a pulverizing or mulching zone and (3) then passing the processed lawn debris material into a storage container are not known or available in the market. It is well known that there is need for such a device. The optimum conditioning or reconditioning of thatch and debris in heavy lawns is required. Heavy efforts are presently made to clear the thatch from the healthy, desired grass and then, separately, collect and bag same. Great efforts are employed in this latter type of task.

Elements of this invention and process are known, per se. Thus, it is well known to rake up or pick up materials in a lawn with the line of travel of a power raking machine. It is known to use an airflow creating means to move lawn debris materials with respect to, say, a conveyor system. It is known to take materials raked from a lawn and pass them into a blade comminuting system. It is, of course, old to put collected materials derived from lawn raking, comminuted or not, into a collection bag or zone. What has not been done in the art is to provide an integrated system involving highly efficient raking, highly efficient transport of raked materials from the raking zone, direct passage of the said material into a comminuting zone of great effectiveness and efficiency, continuous withdrawal of comminuted material from the last mentioned chamber and, thereafter, a process and means for moving and passing the comminuted material to a closed, yet venting container in a continuous manner, retaining the comminuted material in the container and venting the air from the container.

THE PRIOR ART

Applicant is aware of the following patents directed to lawn mowing, material picking up, leaf gathering, leaf communication, lawn and litter cleaners and lawn sweepers.

Nelson U.S. Pat. No. 962,780 "Lawn Mower" issued Jun. 28,. 1910;

Hand et. al. U.S. Pat. No. 1,483,848 "Cotton Picker" issued Feb. 12, 1924;

Ronning U.S. Pat. No. 2,661,584 "Mobile Leaf Gathering, Comminuting and Redistributing Machine", issued Dec. 8, 1953;

Judkins U.S. Pat. No. 2,984,96]"Lawn Cleaner", issued May 23, 1961;

Finn U.S. Pat. No. 2,990,019 "Litter Cleaning Apparatus", issued Jun. 27, 1961;

Norden U.S. Pat. No. 3,184,777 "Lawn Sweeper", issued May 25, 1065; and

Erickson U.S. Pat. No. 3,212,247 "Suction Operated Seed Gathering Mechanism", issued Oct. 19, 1965.

BRIEF DESCRIPTION OF THE DEVICE (INVENTION)

Functionally, the subject machine and device has a number of separate yet interactive and active zones. The first of these active zones is a raking and/or sweeping zone where tines and/or brushes rotate in a direction opposite to the direction of motion of the device. Leaves, thatch and like materials from conventional lawns and yards are drawn, swept and/or raked out of the grass forwardly and upwardly into a receiving channel in the device. This channel is essentially the breadth of the machine which is also the breadth of the raking/sweeping zone and mechanism. There is an air flow from the outside and underside of the device upwardly into the raking/sweeping zone and into this channel created by fan/comminuting blade rotation.

The material is moved from the channel by the said air flow into a comminuting or mulching chamber which contains a high speed rotating blade therewithin analogous to a rotary lawn mower blade, but in no way positioned to contact the grass of the lawn. It is the high speed rotation of this blade, as well as its configuration, which draws air into the machine zones as described, thus drawing the raked material into the blade/comminuting/mulching chamber.

The underside of the said comminuting/mulching chamber is sealed and baffled, while the overhead top wall thereof is channeled and perforated in such manner that the air blast created above the blade by its rotation drives comminuted and mulched materials out of the said blade containing chamber.

An overhead, arcuate, inclined (upwardly inclined) enclosed pathway takes the material and air blast from the said blade chamber and passes such to an overhead duct. This duct leads to and feeds into a perforated bag which retains the mulched thatch, etc. while passing outwardly through the pores thereof, the air driven by the blade. Means are provided on the device itself to receive and hold the said porous bag, such being of very large volume in order to be able to hold a large quantity of mulched thatch.

A single power means is so connected and reversibly linkable to (1) wheels mounting the frame of the device, (2) the drive for the raking/sweeping elements and (3) the drive for the cutting/mulching blade that such can be separately driven and controlled, one with respect to the others. The entire device is driveable, handleable and controllable by a single operator.

OBJECTS OF THE INVENTION

A first object of the invention is to provide improvements in lawn raking for thatch and like materials wherein the entire operation, process and apparatus is power operated and the raked materials are mulched and thereafter stored in a container so there is no recycle of undesirable or raked materials to the lawn.

Another object of the invention is to provide methods of and apparatus for lawn raking (for thatch materials and the like) wherein the raked material is picked up by the machine, comminuted and stored, the entire process and operation being enclosed in the machine and providing a very clean operation for the operator, thus minimizing health hazards of any and all sorts in power lawn raking and lawn debris handling.

Another object of the invention is to provide methods of and apparatus for the processes, operations and jobs heretofore described wherein (1) the raking, per se, (2) the material comminution or mulching, per se and (3) the material collection and storage, per se are all better handled in cooperation with one another and carried out in highly dependable manners and so as to give the most positive performance at each step.

Another object of the invention is to provide such methods, processes and apparatus where the subject device will rake and function effectively under strong wind conditions. That is, the entire area of debris being worked by the device in the various stages of the process is enclosed and under immediate control. Said otherwise, the work is done on an undisturbed lawn area because the device encloses the immediate raking work area and, further, the material drawn from the work area is put into an entirely enclosed system which ends up depositing the processed material in the storage bag.

Yet another object of the invention is to provide such a device wherein, by virtue of the rear wheels of the device being adjustable in height, the device can either sweep the lawn or rake the lawn; that is, dropping the device on the wheels effects raking of the lawn, while raising the device on or with respect to the rear wheels operates to merely sweep the lawn.

Still another object of the invention is to provide methods and processes, as well as apparatus and means for (1) reverse raking or sweeping a lawn, (2) suctioning the raked or swept material into a housing by means of a high speed rotating cutter, (3) mulching or comminuting the materials originally swept up by the cutter blade in said housing and (4) blowing the mulched or comminuted material overhead from the housing mulching chamber into a bag, the impetus for moving the raked or swept material from the raking zone to the bag entirely provided by the rotating cutter blade and its housing structure.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

FIG. 3 is a side elevation or view of the opposite side of the vehicle/device of FIG. 1 (taken from the top of FIG. 2 looking downwardly in that view), specifically, taken from the right band side of the device looked at from the stand point of the operator standing in back of the device (the operator's position being to the left in FIG. 3 and to the right in FIGS. 1 and 2).

FIG. 4 is a view taken along the line 4—4 of FIG. 1 in the direction of the arrows.

FIG. 5 is an enlarged detail of the belt tightener device seen in the lower right center of the view of FIG. 3 for driving and releasing the drive with respect to the vehicle as a whole;

Figure 11:
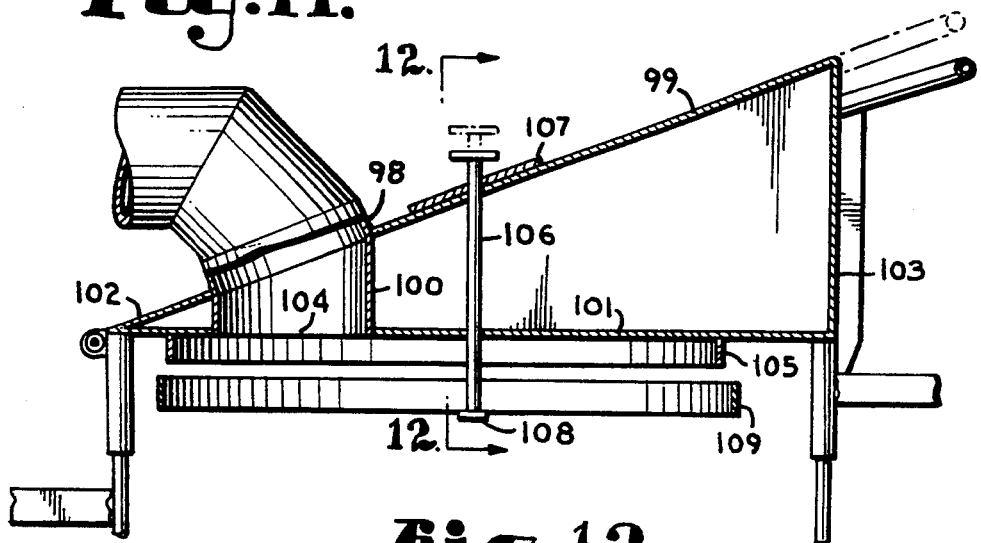

FIG. 11 is a vertical plane sectional view taken through a plenum or chamber to which the discharge duct optionally connects. The orientation of the view is like that of FIG. 1. In this rendering, the duct does not communicate into the plenum or chamber but goes right therethrough to discharge above the center of the bag top gripping mechanism.

Figure 12:
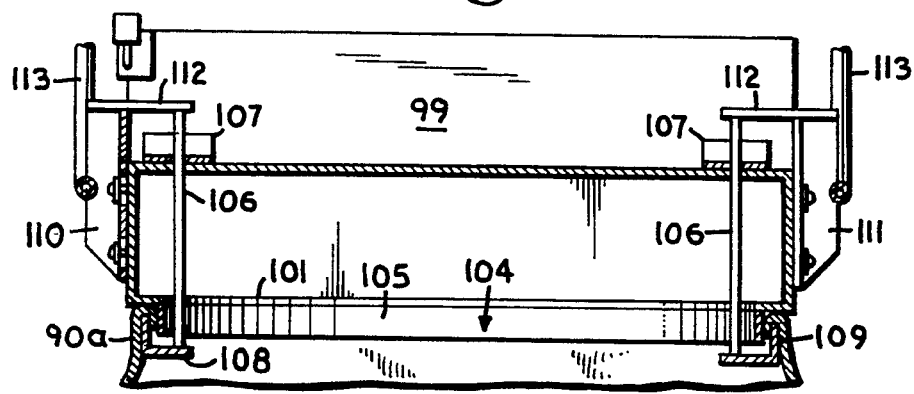

FIG. 12 is a view taken along the line 12—12 of FIG. 12 in the direction of the arrows and shows, first, the mechanism for moving the outer ring of the bag top engaging mechanism upwardly and downwardly with respect to the inner ring and, secondly, shows the top of the bag engaged between the outer and inner rings.

Figure 6:
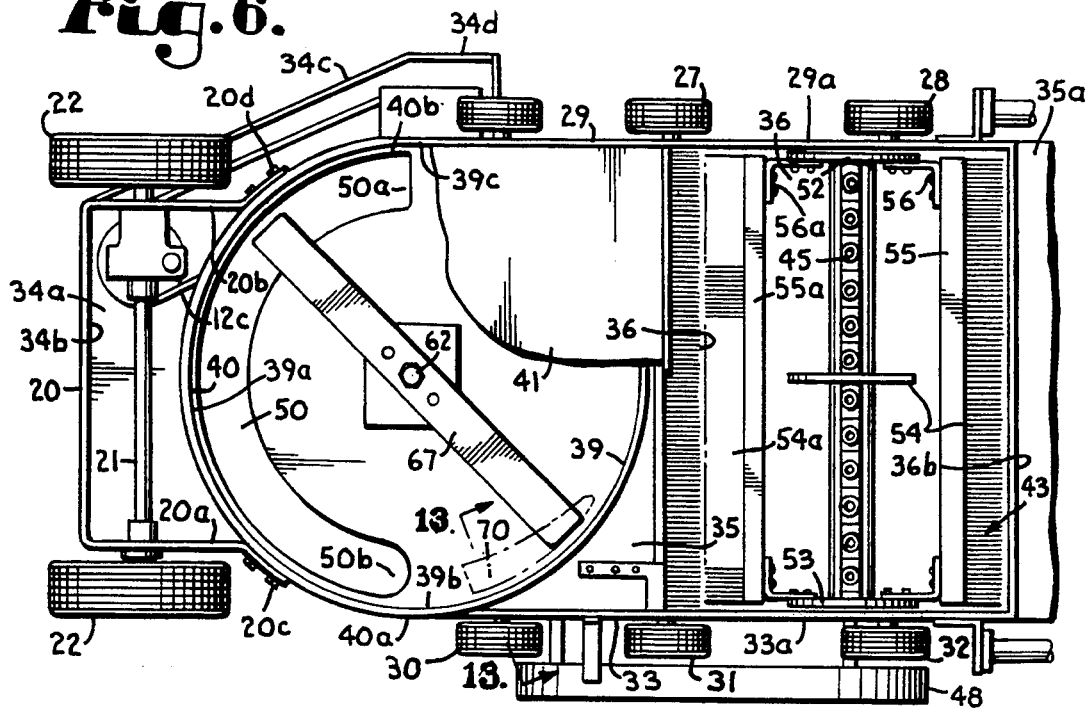
FIG. 6 is a bottom view of the device with parts cut away to better illustrate the construction of various parts of the device, particularly including the cutting or mulching chamber and blade therein, the vehicle having its front end to the left as is the case in FIGS. 2 and 4, as well as FIG.

FIGS. 13 is a view taken along the line 13—13 of FIG. 6 in the direction of the arrows.

BRIEF DESCRIPTION OF THE INVENTION

This device is primarily directed to lawn thatch and leaf raking, mulching or comminuting of such, and comminuted material handling and storage on a working machine. It is a device which may be used to clear thatch and other debris from the depths of the grass at any level up to the surface of the grass where only sweeping of the grass may be provided.

The device itself is a multiple wheeled vehicle operated to be moved or driven across a lawn, it having a basic, integral structural frame and wheels carrying said frame. The vehicle has front and rear ends according to the normal direction of movement of the device in operation and a first, central, longitudinal axis aligned with said normal direction of movement.

A near cylindrical, downwardly opening raking and sweeping chamber or drum is provided adjacent the rear end of the vehicle. This chamber or drum has a second, longitudinal axis thereof which extends at substantial fight angles to the first longitudinal axis. Rotatable reverse raking and sweeping means are supplied in said near cylindrical chamber which operate to contact and penetrate the grass over which the vehicle moves and pick up and move thatch, leaves and other lawn debris from said lawn as the vehicle moves thereover. Means are provided in an enclosed area forwardly in said device of said raking and sweeping chamber for effectively disengaging, retaining and conveying thatch, leaves and other lawn debris from the said raking and sweeping means.

A comminuting and mulching zone is provided, immediately forward of said latter mentioned enclosed area, said zone made up of a substantially enclosed, U-shaped chamber (in top plan view), such chamber opening at the rear thereof into said enclosed area and further opening partially overhead for discharge of comminuted, mulched, thatch, leaves and lawn debris therefrom. This substantially enclosed, save at the rear, U-shaped chamber has normally horizontal top and bottom walls and a near circumferential, normally vertical outer front and side walls connecting portions of the peripheries of said top and bottom walls and spacing them apart, vertically, one from the other. Thus, the front end of said mulching zone, in vertical plan view, is substantially half circular. The rearward end of said mulching zone, however, is squared off at substantial fight angles to said first longitudinal axis and, at the rear end thereof, communicates with, and is fixed to the forward end of said channel.

An airflow creating, as well as communiting and mulching rotating blade is horizontally mounted on a normally vertical drive shaft in said mulching zone housing. This blade, in its rotation, has a close circumferential fit at its outer end to a circumferential surround comprising an inward, downwardly extending circumferential flange connected to at least the rear and rear center of the bottom surface of the top wall of the mulching zone which closely surrounds the peripheral ends of the blade. This flange may merge with the front portion of the side wall connecting the top and bottom chamber walls at the front and sides of the chamber. This flange ends, at least in the rearward portion thereof, at a height equal to the height of the beam or flange supporting the cleaning brushes, the latter extending rearwardly to the front end of the cylindrical chamber carrying the raking and sweeping means.

In the top wall of the U-shaped, front mulching zone, there is provided an arcuate, slotted, passageway near the front periphery thereof. This passageway runs from shallow to deep in the direction of the rotation of the blade whereby the pitch of the blade and rotational direction thereof operate to force or blow the thatched or mulched material into and along the slotted passageway, which has an opening outwardly through the top plate or wall near the far end thereof to remove the mulched material from the mulching zone.

An air venting, but thatch retaining storage bag is positioned and received on an upper platform of said vehicle. A conduit is connected to the slotted passageway at its deep, discharge end at the opening out of the top wall which leads upwardly on the device to the said thatch storage bag. Thus thatch, leaves and lawn debris are reverse raked and airflow drawn into the raking, etc., chamber, freed from the raking and brushing members of the initial collector, passed into the thatching and mulching chamber under the control of a shaped flange as will be described and thence comminuted by rotating blade in the mulching zone and then blown out of the mulching zone through a conduit into an air evacuating, but thatch, comminuted leaf and debris retaining container.

The power means on the vehicle, first, drives the vehicle itself, per se. If suitably engaged by the operator, secondly it drives the reverse raking mechanism and, yet further, third, drives the rotating cutter, (mulching and comminuting blade), as well. A plurality of power devices could be employed for this, but this disclosure shows the use of but a single power device to accomplish all three goals.

The described device enables the provision of a process of treating a lawn for removal of thatch, leaves and other lawn debris therefrom, in adjustable manner which comprises a number of operative steps:

(1) The vehicle is moved to and fro over the lawn, overriding and covering areas desired to be thatch, leaf or debris cleared;

(2) Thatch, leaves and debris is reverse raked from the lawn in the direction of motion of the vehicle into and within a rearmost chamber of the vehicle.

(3) The raked thatch, leaves and other debris are separated from the collecting members in an enclosed area of the vehicle immediately ahead of the rearmost raking chamber.

(4) Powerful air flow passes the thatch, debris and leaves forwardly into the lower portion of a forwardmost comminuting and mulching zone (comprising a substantially enclosed, high speed rotating cutter blade chamber) below said blade;

(5) The swiftly and powerfully rotating edged blade communites and mulches said thatch, leaves and debris in said blade chamber.

(6) By physical force and air pressure from said blade, mulched and comminuted thatch, leaves and debris are drawn and driven over the blade into a passage and slot in the top wall of the chamber above the blade and thence out an opening at the deep end of the slot in the top of the blade chamber.

(7) Thatch, debris and leaves, all mulched, after leaving said mulching zone, are blown through a conduit into a storage bag which vents the air but retains the mulched material.

It may be seen that the entire recited action and motion of and in the thatch, etc., handling process, once the thatch, leaves and debris are freed from the device's original pickup apparatus, is all caused and effected by the air currents drawn into the lower rear of the vehicle by the rotation of said cutter blade and blown out of the mulching zone at the top opening by the air blast created by the cutter blade.

STRUCTURE AND FUNCTION

Figure 1:
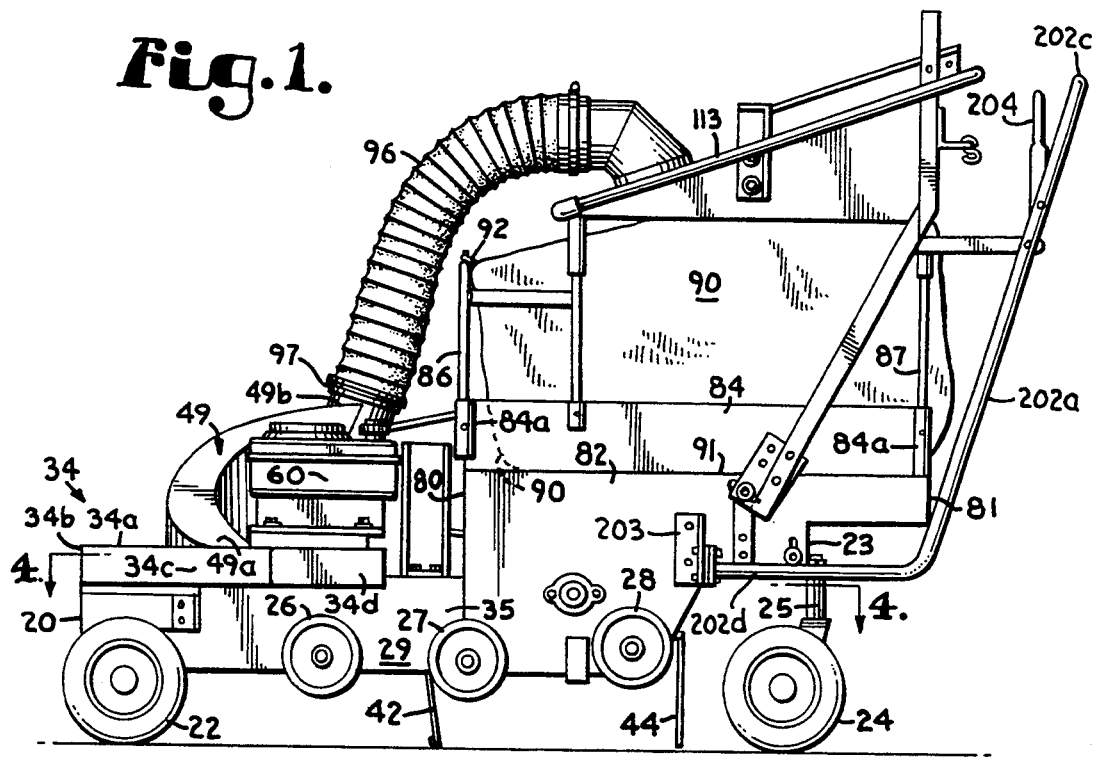
FIG. 1 is a side view of the subject device taken from the left side of the device viewed with respect to the left hand of the operator who stands to the right in FIG. 1 (behind the device), looking to drive the device to the left in FIG. 1.
Figure 2:
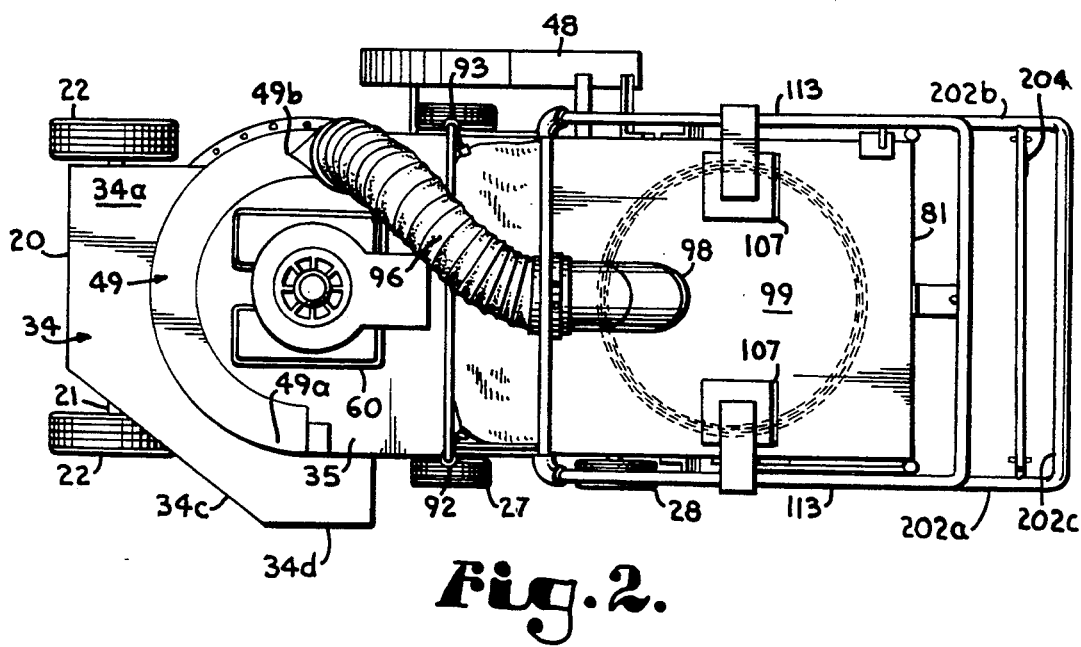
FIG. 2 is a vertical plan view, from above, of the device of FIG. 1.

Turning to FIGS. 1-4, inclusive, particularly, the general layout of the device will be described. As has been previously stated, FIG. 1 is a side view (first side view) of the device, taken from the left side thereof, the designated left being the left hand side of the operator who would be standing to the fight of the vehicle in FIG. 1 facing to the left in FIG. 1 with his/her left side toward the viewer. FIG. 2 also has been noted as a top elevation looking down from above of the subject device. FIG. 3 is the fight hand side view of the device opposite to the side shown in FIG. 1. Finally, FIG. 4 is a top view of the device taken essentially along the line 4—4 of FIG. 1 in the direction of the arrows, but maintaining the top wall of the half cylindrical, downwardly opening, raking and sweeping chamber in the center fight of the view intact.

Figure 8:
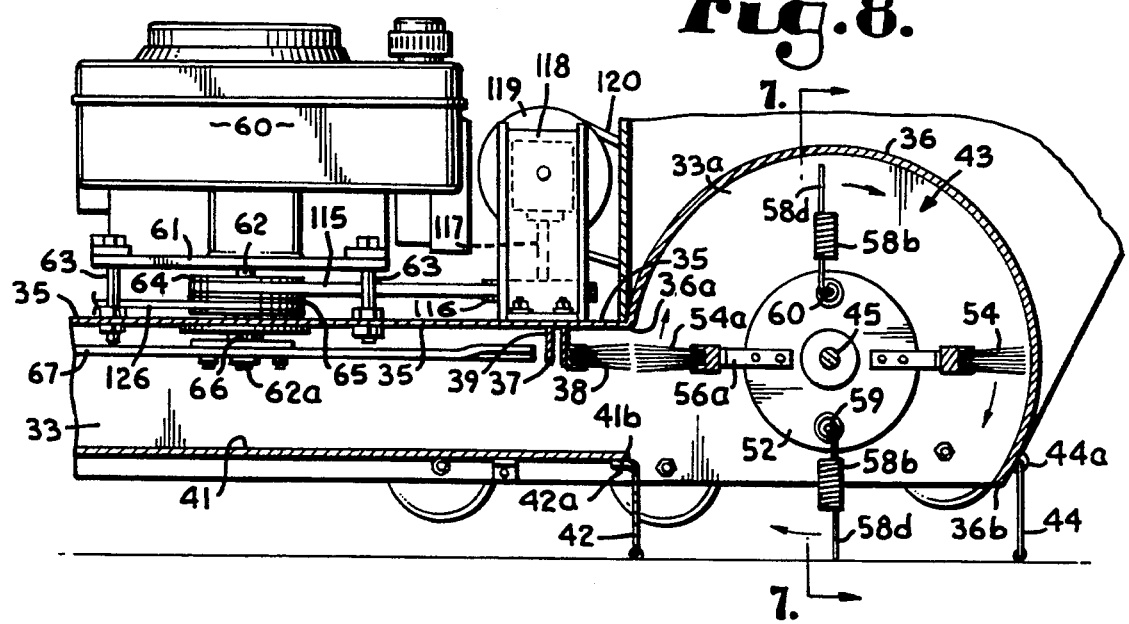
FIG. 8 is a view taken along the line 8—8 of FIG. 7 in the direction of the arrows.

FIG. 6 also is significant as one of the near overall or overall views in that it is a bottom view of the device with the bottom wall of the mulching chamber cut away to show the upper interior thereof. FIG. 8 is useful as a semi-overall vertical sectional view with respect to the details of the rearwardly positioned raking and sweeping chamber positioned under the half cylindrical hood positioned adjacent the rear of the vehicle.

The device has a front end 20, which is the leading end of a frame construction designed to carry a first wheel shaft 21 having a front wheels 22 thereon. The lower rear end of the device is seen at 23 and comprises the rear portion of the structural frame integral with the forward structural frame 20. Rear main wheels 24 are pivotally mounted at or adjacent lower rear end 23 by transverse shaft 25. Thus, as seen in FIG. 3, rear wheels 24 may be swivel positioned for rearward movement (24 in FIG. 1 ) and forward movement at 24' in FIG. 3.

Secondary, emergency action wheels 26, 27, and 28 are provided along the left side 29 of the frame between main wheels 22 and 24. Likewise, secondary wheels 30-32, inclusive are likewise rotatably mounted on the fight side 33 of the base frame, as best seen in FIG. 3.

Frontmost wall 20 has mounted thereabove shield 34 having top wall 34a, front wall 34b, left side walls 34c and 34d and fight side wall 34e. The top wall of the housing itself may be seen at 35 in its forward, normally horizontal position in the rear center portion of the vehicle or device. Top wall 35 gives way rearwardly (FIG. 4) to a semi-cylindrical transversely arcuate wall (transverse to the direction of motion of the vehicle and the longitudinal axis thereof) which is seen from the top in FIG. 4, the underside in FIG. 6 and in longitudinal transverse section in FIG. 8. Looking at FIG. 8, drum 36 has upper forward edge 36a joined to top wall 35 and lower rearward edge 36b. The rear side wall portions 29 and 33 enlarge upwardly as at 29a and 33a to seal the side portions or ends of the housing or drum 29 in which the reverse raking and sweeping occur. Particularly referring to FIGS. 6 and 8, at 37 is seen a transverse vertical flange extending entirely transversely across the width of the machine between side walls 29 and 33, to which is continuously attached a rearwardly facing brush 38.

To the underside of wall 35, the top wall, forwardly of flange 37, there is attached circular vertical wall 39 with front portion 39a and side portions 39b and 39c. The height (or depth) of circular flange 39 is substantially that of flange 37 up until the zones or points 39a and 39b where the arcuate flange portion 39 merges into or becomes full depth secondary front wall 40 which merges, at its 180 degree rearward edges 40a and 40b with side walls 33 and 29, respectively. Looking at FIGS. 4 and 6, the lower frame with front wall 20 has forward side wall 20a and 20b which are bolted at 20c and 20d to arcuate front wall portion 40. There is a bottom wall 41 closing the circular chamber thereabove having an arcuate front portion 41 a (FIG. 4) and a depending plastic/rubber flap 42 (FIG. 3, FIG. 8) from the straight transverse rear edge 41b thereof. This somewhat flexible but normally downwardly hanging flap 42 extends entirely across the front (leading) width of the raking chamber 43 under housing 36 and between walls 29a and 33a. At the rear end of the housing 36, a second depending flap 44 is hingedly mounted at its top at 44a (as is flap 42 at 42a from FIGS. 1 and 8) and from the positions of flaps 42 and 44, the position of raking and pick up zone 43 along the length of the device can be seen, just about centered with respect to the entire device seen in FIGS. 1 and 3, but near the end of lower rear wall 23, particularly seen in FIGS. 1, 3 and 4 with respect to the rear wheels 24.

Figure 7:
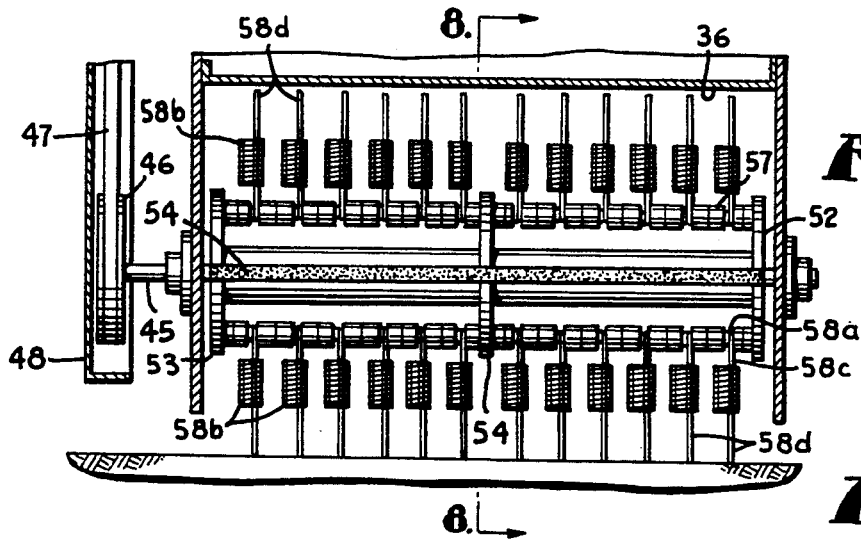
FIG. 7 is a view taken along the line 7—7 of FIG. 6 in the direction of the arrows.
Figure 9:
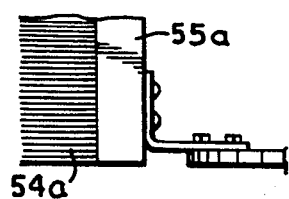
FIG. 9 is an enlarged detail of the lower left hand corner of the sweeping/raking chamber of FIG. 6 showing bow the brush element is mounted on the disk driven in rotation by the belt.

Particularly referring to FIGS. 6-8, inclusive, therein is rotatably received shaft 45 which is driven by pulley 46 through belt 47. Shaft 45 is mutably received in bearings at each opposite side of chamber 43. A pulley/belt screen cover 48 may be provided on the fight side of the vehicle where pulley 47 is located.

Looking at FIGS. 1-3, inclusive, and particularly FIG. 6, left hand side, it may be seen that an arcuate upwardly rising conduit 49 having a low end 49a and a high end 49b, the former on the left hand side of top wall 35 and the latter on the right hand side thereof is provided almost precisely following (inside) the front arc (FIG. 6) of arcuate front wall 40 of the mulching-/comminuting chamber 33. The open underside of this rising, turning wall is seen at 50, 50a, and 50b of FIG. 6. Still viewing FIG. 6, it may be seen that the top of wall 50, etc., comprises an arcuate depression increasing in depth counter-clockwise from 50a to 50b (49a to 49b) made in the front essentially 180 degrees of top wall 35 at 50 beginning with a shallow end 50a (top of FIG. 6) and increasing in depth as it curves around front wall 40 to a deep end 50b.

Returning to the fight hand sides of FIGS. 4, 6 and 8 and also particularly referring to the center of FIG. 3 and FIG. 7, it has been established that a shaft 45 is rotated in the direction of the arrows of FIG. 8 by pulley 47, which is driven by a belt to be described, from the power source also to be described. Particularly looking at FIG. 8, it should be noted that its extension to the fight in the view is approximately the same as the missing extension to the fight in the view of FIG. 6. That is, the entire left hand side of FIG. 3 is omitted, which involves the rear main support wheels 24 and the refuse catch bag which remains to be described, as well as the shafts and arms for support and control of the device, assuming the operator at the left in FIG. 3 hand fight in FIG. 4 from FIGS. 6 and 8.

Mounted on shaft 45 at the opposite ends thereof, but inside housing 29a and 32a are (FIGS. 6 and 7) circular plates 52 and 53 with central circular plate 54 like thereto, opposed to each of them as being mounted centrally of shaft 45. Plates 52 and 53 are spaced inwardly of outer chamber walls 29a and 33a for rotative clearance and may employ any type of spacer or bearing therefor.

There are two types of pickup and clean up devices carried by the plates 52-54, inclusive, in their clockwise rotation in FIG. 8, or counter-clockwise direction in FIG. 3. That is, first there are 180 degree opposed, radially outwardly facing brushes 54 and 54a. As seen particularly in FIG. 6, brushes 54 and 54a are continuous in length (or width) for the width of the chamber defined between side walls 33a and 29a, as well as arcuate front, top and side wall 36. This space or volume is labeled 43. The elongate continuous bases 55 and 55a of the brushes are fastened and fixed in position with respect to outer plates 52 and 53 by angle irons 56 and 56a. As may be seen in FIG. 8, the brushes sweep the essential periphery of wall 36 and actually periodically contact, with the ends thereof, static transverse brush 38 opposed thereto at the exit to the chamber 43. In effect, then, there are two 180 degree, elongate, continuous, stiff brushes 54 and 54a, which, as shaft 45 is driven in revolution, actually sequentially brush along, brush into or brush down into the grass or tuff the machine is working.

Figure 10:
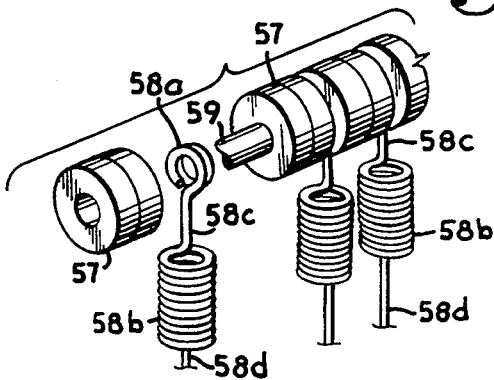
FIG. 10 is an enlarged detail of bow the coil springs, carrying the end scratching tines for the rakes, are removeably mounted on the paired, opposed shafts carried by the disks mounted by the basic drive shaft of FIGS. 6–8, inclusive.

This is, however, not the prime or only action of this device. Looking at FIG. 10, it may be seen that shaft 45, along the length thereof (in two sets or groups because of the presence of the central plate 54) is provided with cylindrical, hollow membered spacers 57 which sandwich, between pairs thereof, the inward attachment loops 58a of coil springs 58b which have upper tine 58c and lower tine 8d. the latter free ended and straight, see FIG. 8. It should be pointed out that the spacers 57, by the use of shims, at the end thereof, are preferably mounted either quite rigidly in the positions seen in FIG. 8 (180 degrees opposed from one another and 90 degrees opposed from the brushes) or more loosely whereby to limit penetration of the bottom tines 58d into the tuff. Generally speaking, the tines are very strongly and stiffly mounted by the spacers so that any yielding due to hitting an object, a rock, or a different ground level is taken up in the flexion of the coil springs 58b.

The entire reverse raking process involves, as the vehicle moves from fight to left in FIGS. 4, 6 and 8, as well as 1 and 2, power driven: shah 45, carrying disks or plates 52-54, inclusive, as well as shafts 59 and 60 thereon, is driven in a clockwise direction in FIG. 8 whereby the tuff (at the left bottom of the view directly below shafts 45 and 59) is continuously and alternatively treated by raking by tines 58d, followed by brushing by brushes 54 and 54a. As each row of brushes 54 and 54a and each row of tines 58d comes (rotates) up to transverse brush 38, reuse of any sort from the tuff, particularly including weeds, grass, dead grass and weeds, debris, branch fragments and the like are freed or disengaged to drop vertically downwardly from the juncture of the static brush 38 and the moving brush or tine to the rear thereof. This material is then seized (and moved left in FIG. 8) by the inwardly drawn air flow to be described with respect to the rest of the device construction for essentially five purposes: (1) Transportation into the chamber 33 from the pickup housing 36 and the brief channel between same and housing 33: (2) movement into and then upwards in a comminuting zone, where all the debris is reduced to a very fine state by a whirling, rotating blade or cutter to be described; (3) transportation from the housing zones of refuse receipt and refuse comminution overhead to a container and (4) receipt within the container and (5) separation of the air volume or blast from the refuse, so that the refuse stays in the storage bag and the air is relieved therefrom so the process can continue without back pressure or back draft of crippling significance.

Looking first at FIG. 8, therein is seen a power source generally designated 60 which mounted by its lower platform 61 to upper deck 35 of the device, particularly see FIG. 1 and 2. This is an entirely conventional, commercial, internal combustion motor, which, in aid of powering the subject device, solely drives downwardly extending shaft 62. Bolts 63 vertically space platform 61 upwardly so that horizontal pulleys may be mounted on shaft 62 to drive belts to be described for purposes to be described. Shaft 62 also, by means of suitable bearing 66, penetrates deck 35 and is fixed at its lower end 62a to elongate, flat, rectangular blade 67 which it drives in rotation.

In FIG. 6, blade 67 rotates in a clockwise direction.

There is a baffle, an arcuate baffle (FIG. 13), mounted at 70 and at 5 o'clock, FIG. 6 left center, over which blade 67 passes in its counterclockwise rotation of FIG. 6. As can be seen, blade 67 rotates, starting from the position of FIG. 6 over baffle 70, drawing in refuse from the pickup chamber to the fight thereof in FIGS. 6 and 8 and then passing it successively into the shallow, less shallow. deepening and deepest portions of slot or depression 50a-50b of FIG. 6. This, of course, is the arcuate rising housing 49a-49b of FIG. 1 and FIG. 3, top view thereof seen in FIG. 2.

Thus, the purpose of the blade 67 is multifold. In the first place, it draws in the refuse collected from the raking/brushing zone 43 of FIG. 8, past static brush 38 and into chamber 33. Once in the chamber 33, and conditioned by the presence of baffle 70, the refuse is comminuted and finally chopped by the blade of the cutter 67. While the cutter 67 draws air in through chamber 43 and past brush 38 (essentially laterally of flaps 42 and 44 in the lower fight hand comer of FIG. 8) once the refuse and air carrying it is in the chamber 33, that air which is drawn upwardly past blade 67 from the chamber portion therebelow at 33 (lower left hand portion of FIG. 8) is drawn and forced upwardly over the blade and centrifugally outwardly thereof, whereby to impact into slot 50a-50b along its length (or rise into arcuate rising chamber 49a-49b), thus blowing an equal percentage of the refuse and air coming into the chamber 33 out of the chamber under positive pressure.

Attention is now drawn to FIGS. 1, 2 and 3. These best show the path of the comminuted refuse and in drawn air blast therewith into the storage bag.

First looking at the refuse receiving bag, per se, over the rearward portion of the vehicle there is provided a platform with front wall 80, rear wall 81 and side walls 82 and 83. Two side retainers 84 and 85 are slidingly received on collars 84a and 85a, respectively. Four of such are received on four vertical posts, 86-89, inclusive. The bag 90 may be seen received on the platform 91 supported by walls 80-83, inclusive. The upper portions thereof are supported by rings 92 and 92 at the front thereof and by other members at the upper rearward corners thereof, thus to keep the full volume thereof, open. The device will start work with the bag emptied and gradually fill up. The bag is made of quite fine mesh, but not too fine to permit the breathing out of the air under pressure driven by the blade and retains the refuse.

An elongate somewhat flexible conduit 96 extends from its lower end and connection 97 (FIG. 3) to the high point of housing 49b and in the particular showing of FIGS. 1, 3, 11 and 12 the upper end 98 is seen removably connected through plate 99 with pipe extension thereof 100 extending downwardly and penetrating substantially horizontal plate 101. Plates 99 and 101 join at their forward lower end 102 and diverge rearwardly and upwardly. While there is shown a rear interconnecting plate 103 for structural strength and rigidity, this is not necessary and either bar structurals or a perforated plate 103 or the like may be provided.

If it is desired that the upper portion of the residue catch bag be supported in a upward position substantially solely by the removable engagement of its input opening with the connection to conduit 96, the construction of FIGS. 11 and 12 may be employed. Here we have plate 101 with pipe section 100 penetrating same with opening 104. Normally vertical continuous ring 105 may be welded to the underside of plate 101 defining and containing opening 104. Vertical rods 106 are provided penetrating openings in plates 99 and 101 and further plates or angles 107 (FIG. 12). Normally horizontal circumferential ring 108 is fixed to the lower ends of rods 106 and circumferentially extends around under flange 105. Horizontal ring 108 has peripherally fixed vertical flange 109 thereon. Suitable external mechanisms such as angles 110 and 111, connected to the tops of rods 106 by plates 12 are raised or lowered from the lowermost position of FIG. 11 where the open top edge of the bag is not seen, to the upper position of FIG. 12 where the top edge portion of the bag 90a may be engaged between flanges 105 and 109. Rods 113, connected to a suitable lever mechanism raise and lower the rods and flanges.

Turning now to the drives, it has already been pointed out that motor or power source 60 drives blade 67 through shaft 62. Looking again at FIG. 8, shaft 62 drives top pulley 64 and through it belt 115, which in turn drives pulley 116. Pulley 116 (FIG. 8) drives shaft 117 which, through gearbox 118 drives pulley 119. Pulley 119, through belt 120 and adjustable tightener 121 drives shaft 145 carrying the spring and brush assembly seen in FIG. 8 at the right. It must, of course be possible to engage and disengage the drive to shaft 45 and this is accomplished (see FIG. 3) through tightener 121 on the pivotal array of beams 122, 123, 124 and 125, wheel 121 normally being drawn toward belt 120 by spring 126. Thus, it may be seen that there are two power drives from the single power source 60 which are independent of driving the vehicle over the ground. These are shaft 45 and blade 61. In point of fact, while, obviously, an internal combustion engine drive is much to be preferred, the device in question can be pushed and/or drawn by one or two men or animals, thus not requiring a motor drive of the vehicle itself.

The linkage immediately above discussed is shown in greater detail in FIG. 5.

Returning to FIG. 8, and the motor motion drive, pulley 65 drives, preferably, belt 126 extending to the left in the view. The path of belt 126 is best seen in FIG. 4 where it engages intermediate pulleys 128 and 127 in an over 90 degree change of direction to engage pulley 129. Pulleys 127–129, inclusive are mounted on shafts 130–132, inclusive. Pulley 129, through a gearbox 133 drives shaft 121. Also see the left hand side of FIG. 6 comparing with the left hand side of FIG. 4.

GENERAL REMARKS

This device is or will be the first machine to actually effectively replace hand raking of turf or lawns. In such action, it provides a much more thorough side-to-side coverage of a given area being worked. That is, it cleans the entire area, side edge to side edge, much better than manual raking could accomplish.

One of the most important assets of this device is that it provides what a turf area or lawn needs by means of clearing only. Specifically, that is, its operation does not disturb the soil itself. It is meant to comb through the turf with as little damage to the grass, earth and grass roots as possible, as well as not effecting the soil condition anyway whatsoever.

Up to now, any machine that brings up, from the grass/turf/soil debris in a single operation disturbs the soil in the process (and thus the grass roots), including hand raking. This effect does not allow for maximum soil conditioning for seeding.

The baffle or deflector positioned on the inside surface of the bottom cover, located directly beneath the rotating cutter blade 67, when the device is in operation, provides a much needed function. As the debris enters the chamber, it immediately is pushed/pulled downwardly and in the direction of rotation of the cutter. The bottom wall of the comminuting chamber performs the function of aiding in directing debris to a given area and aiding in the control of this debris. The baffle or deflector is directly responsible for the movement of the debris so as to continue the motion in certain directions. At the point of rotation of the cutter where the baffle or deflector is located, a percentage of this debris plus air acquired wants to leave the chamber. Because such baffle or deflector is in place, it prevents this from happening and provides for new debris to enter the chamber rapidly and continuously without any back pressure from debris present in the chamber and air movement up and out of the chamber.

The coil spring radial outboard tangs 58b, FIG. 8 provide some added length when in motion, yet are resilient to striking any solid objects, if they are in operation. The tangs (because of the coil springs to which they are attached) stretch when in use because of centrifugal force. The purpose of the coil is to allow for flexibility in the tang. First of all, the tang is, at the opposite end thereof, rotatably mounted on a rod or shaft blank so that it pivots freely. That inner end of the tang is an enclosed circle so as to slip over the rod from one end thereof.

ADDITIONAL REMARKS (1) This will be the first machine to actually replace hand raking.

(2) The device also provides a much more thorough side to side coverage of a given area being worked. That is, it cleans the entire area, side edge to side edge, much better than manual raking could accomplish.

(3) What is important is that this raking machine provides what the lawn needs by means of clearing only. That is, it does not disturb the soil. It is meant to comb through the tuff with as little damage to the grass as possible, as well as no effect on soil condition, whatsoever.

(4) Up to now, any machine that brings up debris in one operation will disturb the soil in the process, including hand raking. This does not allow for maximum soil conditioning for seeding.

(5) The only reverse raking machines that I know of are sweepers. These are not raking machines. There could be "reverse sweeping" machines on the market that pulverize or mulch before going into a container. There could also be vacuums that do this, if that would be relevant.

(6) The baffle or deflector on the bottom cover, located directly beneath the rotating cutter when in operation is providing a much needed function. As the debris enters the chamber, it immediately is pushed down and in the direction of the rotating cutter. (Here it should be mentioned that the bottom cover has a function also. This function is to aid in directing the debris to a given area and aiding in the control of this debris. ) The baffle or deflector is directly responsible for the movement of the debris to continue in a certain direction. At the point of rotation where the baffle or deflector is located, a percent of this debris plus air acquired wants to leave the chamber. Because this baffle or deflector is in place, it prevents this from happening and provides for new debris, etc., to enter the chamber rapidly and continuously without any back pressure from debris present in the chamber and air movement up and out of the chamber.

(7) The coil spring tangs provide some added length when in motion, yet are resilient to any solid objects, as they are in operation. The tangs (because of the coil springs) stretch when in use because of centrifugal force. The purpose of the coil is to allow for flexibility in the tang. First of all, the tang is mounted on a rod, so it pivots freely. That inner end of the tang is an encloses circle so as to slip over the rod from one end of the rod.

(8) The tang pivots freely, there are no stress points to break the tang where it mounts. The coil allows for flexibility on impact with any object it encounters. This allows for the tang to resume its original shape at all times under maximum speed and impact. It should be understood and mentioned that the tangs are made of a tension material to start with so as to maintain a given shape under use conditions.

(9) The tang/brush assembly seen in FIGS. 6, 7 and 8 is split in two parts or halves by the center disc. Each half incorporates both the raking tangs in 180 degree opposition to one another and the sweeping brushes in 180 degree opposition to one another, each tang/brush relationship being 90 degrees apart. The assembly is made to disassemble quickly by removing the split collars that hold them together. These halves are also held in place by means of alignment pins, which are driven through a solid axle or rod which is mounted in bearings and bolted to each side and the frame.

(10) With respect to the stationary brush (FIGS. 6 and 8), such provides a drop off point for all debris carried up by the tangs and picked up by the following brush behind each tang. The tangs actually pass through the brush at the free ends thereof and the rotating brushes or sweepers following the tangs strike the end of the stationary brush. With their radially outward ends when they pass it. The idea is that, after passing by the stationary brush, the debris is (a) swept off or cleaned from the tangs and (b) knocked free from the following sweeper brush. This drop-off area, point or zone is the upper entry part to the short passage (under the brash) (stationary) mulching zone. This area is also the strongest point of entry for debris. You can see that not only have we directed the debris, but we have assured placement of the debris for maximum performance by positioning the stationary brush as it is.

(11) The wheel locator directly underneath the raking (drum) assembly are located so as to prevent it from bottoming out due to the length of the machine. Such also provides a positive placement for the machine in respect to ground working position. They allow the tongs and brush mechanism to retain a more relevant position in respect to working distance from the ground.

(12) Worth mentioning is the handle, as it also functions as a stand. Thus, the operator can tilt the machine backwardly by exerting weight on the handle which allows tilted access to the underside or underneath side of the machine.

POWER AND CONTROL

From the description and the drawings, it is evident that power plant 60 carries out three functions. This is accomplished (left hand side of FIG. 8) by an upper belt 115, a lower belt 126 and the removable fastening of blade 67 to drive shaft 62, 62a at the lower end thereof.

Looking at FIG. 4, looking at the lower end of drive shaft 62 at 62a is seen driving belt 115 connecting to pulley 116. Adjustable belt tightener 200 is mounted on top plate 35. Other belt 126 from pulley 65 drives pulley 129 on gear box 133 on shaft 21 through intermediate pulleys 130 and 131. The latter gives the device front wheel drive through transmission/gear box 133.

As previously noted, pulley 116 drives pulley 119 through transmission 116a (gearbox), whereby pulley 119 drives pulley 47 when belt tightener 121 is activated through the control lever system to be described. See FIG. 5.

It is important to understand that the power plant 60 may be employed to just drive (a) the raking system of the right hand side of FIG. 8, right hand side of FIG. 6 and FIG. 7, as well as (b) blade 67. This would mean that the pulleys 128-130 and belt 126 would be omitted (FIG. 4 and FIG. 8). In such case, the device would have to be pushed by such means as the grasping and guiding bent U-shaped frame 202 having a left hand side 202a, a right hand side 202b, a rearward transverse grasping portion 202c and normally horizontal portions 202d and 202e. These are connected to angled plates 03 on the side frame sheet or plates 82, 83. Such braces as may be needed to rigidify and strengthen this guiding and optional push/pull means with respect to the frame may be provided.

The control for the power plant driving the raking mechanism of FIGS. 6, 7 and 8 (right hand side) is handled by a dead man switch 204 or lever which (FIG. 3) through pivoted linkages with members 205, 125, 124, 123, 122 and 121 operate to tightly engage belt 120 with pulleys 119 and 47 when the dead mans lever or switch is pulled rearwardly toward cross beam 202c.

Also, but not shown in the detail of the last linkage, the pulley 128 is a tightener/loosener pulley which, when moved away from pulley 127 in FIG. 4 loosens belt 126, whereby pulley 129 is not rotated and wheels 22 are not driven. On the other hand, when the dead man's lever/switch 204 is drawn by the operators hand toward member 202c, pulley 131 is moved toward pulley 130, tightening belt 126 and driving pulley 130 and thus shaft 21 and wheels 22.

Since both the raking and machine drive situation are linked to the dead mans lever/switch 204, release of lever 204 (a) stops the raking operation and rotation of shaft 45 and also, as noted, (b) stops the rotation of pulley 129 and movement of wheels 22. This leaves the engine just driving the blade in rotation. Switching off the power then entirely stops the operation of the machine.

From the foregoing, it will be seen that this invention is well adapted to teach all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A thatch raking, mulching, handling and storing device comprising, in combination:
    a wheeled vehicle and opted to be moved across a lawn having a basic, integral structural frame and wheels carrying said frame,
    said vehicle having front and rear ends according to the normal direction of movement in operation and a first, central, longitudinal axis aligned with said normal direction of movement,
    a near cylindrical, downwardly opening raking and sweeping first chamber provided adjacent the rear end of the vehicle, a second, longitudinal axis of said chamber extending to substantial right angles, transversely, to said first longitudinal axis, rotatable raking and sweeping means in said cylindrical chamber which means engages, lifts and moves forwardly thatch from said lawn as the vehicle moves thereover, means in a first enclosed area forwardly of said raking and sweeping chamber for disengaging thatch from the raking and sweeping means, a U-shaped comminuting and mulching chamber and zone provided immediately forward of said enclosed area comprising a substantially forwardly enclosed, U-shaped chamber in top plan view, said zone opening at the rear thereof into said first enclosed area and further opening partially forwardly overhead for discharge of comminuted, mulched thatch therefrom, said U-chamber having normally substantially horizontal top and bottom walls and, at the side and forwardly thereof, vertical side walls and an arcuate half circle normally vertical front wall, all of these connecting to portions of the top and bottom walls and spacing them apart vertically, one from the other, a substantially half circular shallow, rear vertical wall fixed to the underside of said U chamber top wall in rearward portion of the latter comprising the upper part of said zone, and continuing the U chamber forward wall to make a circular chamber therewithin, the front upper end of said zone, within said wall in top plan view, being circular and the rear end thereof substantially squared off at substantial right angles to said first longitudinal axis, a comminuting, mulching and air flow creating blade horizontally mounted on a normally vertical drive shaft in said latter chamber, said blade having a close at least near circumferential surround therewithin, an arcuate, slotted upper passageway and discharge opening therefrom through said U-chamber top wall positioned near the front periphery thereof for receiving and discharging comminuted and mulched thatch out of said chamber over said blade, an air venting thatch receiving and storage bag removably mounted on the upper portion of said vehicle, a conduit connected to said slotted passageway and opening and leading at its other end to said bag, and power means on said vehicle for driving at least said blade and said rake and sweep means.

2. A device as in claim 1 wherein the slotted passage and opening has a rising, arcuate spiral housing increasingly rising above the top surface of the top wall of the U-chamber from thatch intake thereinto upwardly toward a discharge opening therefrom into said conduit.

3. A device as in claim 1 wherein said power means on said vehicle also optionally drives the vehicle itself by at least some of the wheels supporting the vehicle.

4. A device as in claim 1 wherein said raking and sweeping chamber includes both rotating raking tines and rotating sweeping brush means to lift and move forwardly the thatch from said lawn.

5. A device as in claim 1 wherein the means forwardly of said raking and sweeping chamber for disengaging thatch from the raking and sweeping means comprises a substantially horizontal brush mounted transversely across the vehicle underbody extending into said raking and sweeping chamber at substantial right angles to said first longitudinal axis.

6. A device as in claim 1 wherein the front and rear ends of the downwardly open portion of the near cylindrical raking and sweeping chamber have elongate, transverse, normally downwardly extending resilient, lawn contacting closure flaps such both leading and following said chamber, said closure flaps extending at least substantially transversely across the vehicle the length of said raking and sweeping chamber at substantial right angles to said first longitudinal axis.

7. A device as in claim 1 wherein an arcuate baffle having inlet and outlet ends extending in the direction of the cutter blade rotation is provided just inside and at the top of the mulching chamber near the rear end thereof, under the cutter blade, to receive, hold down and channel thatch materials received from the raking and sweeping chamber and enclosed area into the mulching chamber.

8. A device as in claim 7 wherein the slotted passageway begins closely past the outlet ends of said baffle in the direction of rotation of the cutter blade.

9. A device as in claim 1 wherein the arcuate, slotted upper passageway in said U-chamber top wall extends substantially 180° around the front arcuate end of the U-chamber with the passage substantially uniformly deepening from its first end in the direction of rotation of the cutter blade towards the second end thereof in direction of rotation of the cutter blade and the opening is taken from the second end of said passageway to which said conduit is connected.

10. A device as in claim 1 wherein a single power source drives, simultaneously, each of the cutting and mulching blade, said rake and sweep means and the wheels of the vehicle itself.

11. A device as in claim 1 wherein the said comminuting, mulching and air flow creating blade is so configured as to draw air from the rearmost raking and sweeping chamber, the enclosed area forwardly of such chamber and the lower portion of said comminuting and mulching zone and draw and drive it upwardly and into and out of the arcuate, slotted, upper passageway and its discharge opening into the conduit and the air venting thatch storage bag.

12. A process of treating a lawn for removal of thatch therefrom comprising the steps of, in a single vehicle:

(1) moving the vehicle to and fro over the lawn, covering areas desired to be substantially thatch cleared, (2) continuously raking thatch from the lawn in the direction of motion of the vehicle in a rearmost chamber of the vehicle, (3) continuously collecting said raked thatch in an enclosed area of said vehicle immediately ahead of said vehicle rearmost chamber, (4) continuously passing said thatch from said enclosed area into the lower portion of a forwardmost rotating blade comminuting and mulching zone, the latter including a substantially enclosed thatch collection chamber, below said blade and a blade chamber thereabove wherein said blade rotates, (5) continuously comminuting and mulching said thatch above said collection chamber by swiftly rotating said blade thereabove, (6) passing mulched and comminuted thatch through and above said blade into an opening in the top of the blade chamber and
(7) thereafter passing said thatch through a conduit connecting with said latter opening and to an air venting and thatch retaining storage bag,
(8) the entire recited action of the thatch handling process substantially effected by currents of air drawn into the rear of the vehicle by the rotation of said cutter blade, as well as currents of air driven out the front of the vehicle by said blade rotation.

* * * * *